United States Patent
Wigren et al.

(10) Patent No.: US 8,743,725 B2
(45) Date of Patent: Jun. 3, 2014

(54) METHOD AND ARRANGEMENT FOR POSITIONING A WIRELESS DEVICE

(75) Inventors: Torbjörn Wigren, Uppsala (SE); Iana Siomina, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 120 days.

(21) Appl. No.: 13/393,322

(22) PCT Filed: Feb. 15, 2012

(86) PCT No.: PCT/SE2012/050158
§ 371 (c)(1),
(2), (4) Date: Feb. 29, 2012

(87) PCT Pub. No.: WO2012/112113
PCT Pub. Date: Aug. 23, 2012

(65) Prior Publication Data
US 2012/0213105 A1  Aug. 23, 2012

Related U.S. Application Data

(60) Provisional application No. 61/444,235, filed on Feb. 18, 2011.

(51) Int. Cl.
*H04W 4/00* (2009.01)
*H04W 24/00* (2009.01)

(52) U.S. Cl.
USPC .......................... 370/252; 370/329; 370/341

(58) Field of Classification Search
None
See application file for complete search history.

(56) References Cited

U.S. PATENT DOCUMENTS

| | | | | |
|---|---|---|---|---|
| 2006/0276140 | A1* | 12/2006 | Austin et al. | 455/67.11 |
| 2011/0028175 | A1* | 2/2011 | Chang et al. | 455/509 |
| 2011/0312355 | A1* | 12/2011 | Cheng et al. | 455/501 |
| 2012/0020320 | A1* | 1/2012 | Issakov et al. | 370/330 |
| 2012/0052875 | A1* | 3/2012 | Kangas et al. | 455/456.1 |
| 2012/0252487 | A1* | 10/2012 | Siomina et al. | 455/456.1 |
| 2012/0302254 | A1* | 11/2012 | Charbit et al. | 455/456.1 |
| 2013/0217412 | A1* | 8/2013 | Segall et al. | 455/456.1 |

FOREIGN PATENT DOCUMENTS

| | | |
|---|---|---|
| WO | WO 2007/013850 A2 | 1/2007 |
| WO | WO 2008/039123 | 4/2008 |
| WO | WO 2011/031193 | 3/2011 |
| WO | WO 2012/044215 | 4/2012 |
| WO | WO 2012/112113 | 8/2012 |

OTHER PUBLICATIONS

ETSI TS 136 305 v9.3.0 (Jul. 2010); LTE; Evolved Universal Terrestrial Radio Access Network (E-UTRAN); Stage 2 functional specification of User Equipment (UE) positioning in E-UTRAN (3GPP TS 36.305 version 9.3.0 Release 9).

(Continued)

*Primary Examiner* — Chi Pham
*Assistant Examiner* — Soon-Dong D Hyun
(74) *Attorney, Agent, or Firm* — Nixon & Vanderhye P.C.

(57) ABSTRACT

The present invention relates to a method in a network node 40 and a network node 40 with positioning functionality in a wireless communications network in a multi-carrier system. The network node 40 enables UTDOA, Uplink Time Difference of Arrival, positioning measurements for a wireless device in the multi-carrier system. The network node (40) being configured to receive interference or load related information for carriers available for UTDOA positioning measurements and to select at least one carrier for UTDOA positioning measurements based on the interference or load related information.

30 Claims, 5 Drawing Sheets (56) References Cited

OTHER PUBLICATIONS

Jia Lin et al., "LBS Support for Multi-carrier in 16m", IEEE 802.16 Broadband Wireless Access Working Group http://ieee802.org/16>; Jan. 5, 2009.
Notification of Transmittal of International Preliminary Report on Patentability mailed Apr. 8, 2013 in PCT/SE2012/050158.
E. Dahlman et al., "3G Evolution-HSPA and LTE for Mobile Broadband-Section 5.1", 2:nd edition, Academic Press, 2008.
T. Wigren, "Soft Uplink Load Estimation in WCDMA", IEEE Transactions on Vehicular Technology, vol. 58, No. 2, Feb. 2009.
3GPP TS 25.133 v5.1.0 (Dec. 2001), $3^{rd}$ Generation Partnership Project; Technical Specification Group Radio Access Networks; Requirements for Support of Radio Resource Management (FDD) (Release 5), pp. 1-9.
3GPP TS 25.433 v3.8.0 (Dec. 2001), $3^{rd}$ Generation Partnership Project; Technical Specification Group Radio Access Network; UTRAN Iub Interface Node B Application (NBAP Signalling (Release 1999), pp. 1-455.

* cited by examiner

METHOD AND ARRANGEMENT FOR POSITIONING A WIRELESS DEVICE

This application is the U.S. national phase of International Application No. PCT/SE2012/050158 filed 15 Feb. 2012 which designated the U.S. and claims priority to U.S. Provisional Application No. 61/444,235 filed 18 Feb. 2011, the entire contents of each of which are hereby incorporated by reference.

TECHNICAL FIELD

The present invention relates to a method in a network node with positioning functionality in a wireless communications network in a multi-carrier system to enable UTDOA, Uplink Time Difference of Arrival, positioning measurements for a wireless device in the multi-carrier system, and the network node with positioning functionality in the wireless communications network in the multi-carrier system to enable UTDOA, Uplink Time Difference of Arrival, positioning measurements for the wireless device in the multi-carrier system.

BACKGROUND

To enhance peak-rates within a cellular technology, multi-carrier or carrier aggregation solutions are known to be efficient. Each carrier in multi-carrier or carrier aggregation system is generally termed as a component carrier (CC) or sometimes is also referred to a cell. The term carrier aggregation (CA) is also called (e.g. interchangeably called) "multi-carrier system", "multi-cell operation", "multi-carrier operation", "multi-carrier", "multi-frequency carrier" transmission and/or reception. This means that the CA is used for transmission of signaling and data in the uplink and/or downlink directions. One of the CCs is the primary carrier or anchor carrier and the remaining ones are called secondary or supplementary carriers. Generally the primary or anchor CC carries the essential UE specific signaling. The primary CC exists in both uplink and direction CA. The network may assign different primary carriers to different UEs operating in the same sector or cell. Further, carriers may be activated or deactivated for different UEs. Thanks to carrier aggregation, the UE has more than one serving cell: one primary serving cell and one or more secondary serving cell. The serving cell is interchangeably called as primary cell (PCell) or primary serving cell (PSC) or serving cell on primary CC. Similarly the secondary serving cell is interchangeably called as secondary cell (SCell) or secondary serving cell (SSC) or serving cell on secondary CC. Regardless of the terminology, the PCell and SCell(s) enable the UE to receive and transmit data. More specifically the PCell and SCell exist in DL and UL for the reception and transmission of data by the UE. The remaining non-serving cells on the PCC and SCC are called neighbor cells. The CCs belonging to the CA may belong to the same frequency band (aka intra-band CA) or to different frequency band (inter-band CA) or any combination thereof (e.g. 2 CCs in band A and 1 CC in band B). The carriers in intra-band CA can be adjacent (aka contiguous) or non-adjacent (aka non-contiguous).

Dual-Carrier High-Speed Downlink Packet Access (DC-HSDPA, also known as Dual-Cell HSDPA) was introduced within the 3rd Generation Partnership Project (3GPP) Rel-8. DC-HSDPA enables reception of data from two cells simultaneously, transmitted on two adjacent carriers in a same base station and sector, to individual wireless devices. The concept of DC-HSDPA is in 3GPP Rel-10, being extended e.g. to 4 downlink carriers (known as 4C-HSDPA).

In HSPA release 10 up to 4 downlink carriers can be aggregated as 4C-HSDPA where the downlink carriers or cells may belong to the same frequency band or may be split over two different frequency bands e.g. 3 adjacent downlink carriers in band 1 (2.1 GHz) and 1 downlink carrier in band VIII (900 MHz). In HSPA Rel-11 even up to 8 downlink carriers may be aggregated, this configuration may be denoted as 8C-HSDPA; the downlink carriers may be distributed over 2 or even more bands.

To complement DC-HSDPA, in 3GPP Rel-9, Dual-Carrier High-Speed Uplink Packet Access (DC-HSUPA) was also introduced. DC-HSUPA enables an individual wireless device to transmit data on two adjacent carriers simultaneously to a radio access network. DC-HSUPA according to 3GPP Rel-9 is in essence an aggregation of legacy (Rel-8, single-carrier) HSUPA.

In LTE (Long Term Evolution) intra-band CA up to 5 downlink carriers and 5 uplink carriers each of up to 20 MHz may be aggregated by the wireless device. In LTE inter-band CA, up to 5 downlink and 5 uplink carriers each of up to 20 MHz and belonging to different bands can be aggregated by the wireless device. Even additional carriers may be introduced in future releases. CC in CA may or may not be co-located in the same site or base station. For instance the CCs may originate (i.e. transmitted/received) at different locations (e.g. from non-collocated BSs (Base Stations), RRHs (Radio Remote Head) or RRUs (Radio Remote Unit).

Although the additional spectrum bandwidth associated with multi-carrier operation does not increase "spectral efficiency" (maximum achievable throughput per cell per Hz [bps/cell/Hz]), the experienced user data rates are increased significantly. In particular, for bursty packet data traffic at low and moderate load, the data rate is proportional to the number of carriers exploited. Moreover, power inefficient higher order modulation schemes can be avoided (which is especially important in the uplink) and the practical as well as theoretical peak data rate of the system are naturally increased.

In a network according to the 3GPP specifications a RNC (Radio Network Controller) controls radio resources and radio connectivity within a set of cells. Handover and radio access bearer admission control is presumed to be conducted in the RNC based on measurements of path loss etc on a primary carrier (alternatively referred to as an anchor carrier). RAN (Radio Access Network) is according to the 3GPP specification responsible for the radio transmission and control of the radio connection. A Node-B, also referred to as Node B, handles the radio transmission and reception within one or more cells. In case of a distributed RAN architecture where Node-B and RNC functionality as defined in 3GPP specifications are co-located in the base station, the base station would naturally handle also these functionalities. In a DC-HSUPA capable Node-B, the other carrier, which is referred to as a secondary carrier, is assumed to be configured by the RNC for a given DC-HSUPA capable wireless device and then scheduled and activated by the Node-B whenever feasible and useful (with the standard objective function to maximize the supported traffic volumes, or aggregate system throughput, subject to fairness criteria and quality of service constraints, such as minimum bit rate or maximum latency requirements). A primary carrier, on the other hand, may not be temporarily deactivated by the Node-B: to deactivate a certain primary carrier for a connection, the connection is either released, or an inter-frequency handover is performed (in which case another carrier will become the primary carrier).

For each wireless device connected in DC-HSUPA mode, the serving Node-B hence controls whether or not a secondary carrier is activated, and a separate grant is selected for each activated carrier.

Furthermore, if a secondary carrier is activated by the Node-B, it is assumed that the Dedicated Physical Control Channel (DPCCH), which includes a sequence of pilot bits, is transmitted in uplink on that carrier, and the Node-B hence tries to detect this signal.

UTRAN (Universal Terrestrial Radio Access Network) is a collective term for the Node B's and RNCs which make up a UMTS Radio Access Network (RAN). The wireless device may be in a CELL_FACH state, where the UTRAN may redirect the wireless device to another frequency. In a future system, one can envisage multi-carrier operations in the CELL_FACH state. Node-B controlled carrier selection of the uplink transmissions will then be introduced. Load estimation in the WCDMA (Wideband Code Division Multiple Access) uplink is performed for many reasons in prior art. Most importantly, the present scheduling of enhanced uplink traffic is based on the principle to schedule users until a load threshold is reached. Such scheduling decisions are taken every 2/10ms transmission time interval (TTI). Thresholds are typically used in order to maintain a planned coverage, and to maintain cell stability avoiding inner loop power control (ILPC) rushes. When coverage is addressed neighbour cell interference is incorporated in the load measure, this is not the case when cell stability is treated. The scheduling and load estimation functionality and algorithms are both located in the WCDMA RBS.

It is also possible to use the estimated uplink load in load based admission control algorithms. Also this is known in prior art. These algorithms use the uplink load in order to determine if new users can be admitted in specific cells. The admission control functionality is located in the RNC node. Signaling means for signaling of load is available over an NBAP interface. It is e.g. shown in H. Holma and A. Toskala, WCDMA for UMTS—Radio Access for Third Generation Mobile Communications. Chichester, UK: Wiley, 2000 that without advanced interference suppressing (IS) receivers and interference cancellation (IC), the load defined at an antenna connector is given by the noise rise, or rise over thermal, RoT(t), defined by $$RoT(t) = \frac{RTWP(t)}{N},$$

where N is the thermal noise level as measured at the antenna connector. The definition of RTWP(t) is the total wideband power $$RTWP(t) = \sum_{k=1}^{K} P_k(t) + I(t) + N,$$

also measured at the antenna connector. Here $P_u(t)$, $u=1, \ldots, U$, denotes the power of uplink user u, and $I(t)$ denotes the power as received from neighbor cells of the WCDMA system. A problem that now needs to be addressed is that the signal reference point is, by definition, at the antenna connector. The measurements are, however, obtained after an ana- logue signal conditioning chain, in a digital receiver. The analogue signal conditioning chain may unfortunately introduce a scale factor error of about 1-3 dB. Fortunately, all powers of the cell are almost equally affected by the scale factor error so when the RoT is calculated, the scale factor error is cancelled as $$RoT^{DigitalReceiver}(t) = \frac{RTWP^{DigitalReceiver}(t)}{N^{DigitalReceiver}(t)}$$

$$= \frac{\gamma(t)RTWP^{Antenna}(t)}{\gamma(t)N^{Antenna}(t)}$$

$$= RoT^{Antenna}(t).$$

The RoT can hence be measured in the receiver. The major difficulty of any RoT estimation algorithm still remains though, namely to separate the thermal noise power from the interference from neighbor cells. That this is troublesome can be seen from the following equation, where E[ ] denotes statistical expectation, and where Δ denotes the variation around the mean.

$$I^N(t)+N(t)=E[I^N(t)]+E[N(t)]+\Delta I^N(t)+\Delta N(t),$$

The fundamental problem can now be clearly seen. Since there are no measurements available in the RBS that are related to the neighbor cell interference, a linear filtering operation can at best estimate the sum $E[I^N(t)]+E[N(t)]$. This estimate cannot be used to deduce the value of E[N(t)]. The situation is the same as when the sums of two numbers are available. Then there is no way to figure out the values of the individual numbers. This issue is analyzed rigorously for the RoT estimation problem in T. Wigren, "Soft uplink load estimation in WCDMA", *IEEE Trans Veh. Tech.*, February, 2009 where it is proved that the noise power floor is not mathematically observable. Nonlinear algorithms that provide approximate estimates of the noise floor are therefore used.

One algorithm that is currently in use estimates the RoT. One main problem solved by the estimation algorithm is the accurate estimation of the thermal noise floor N. Since it is not possible to obtain exact estimates of this quantity due to the neighbor cell interference, the estimator therefore applies an approximation, by consideration of the soft minimum as computed over a relative long window in time. It is important to understand that this estimation relies on the fact that the noise floor is constant over very long periods of time (disregarding the small temperature drift).

The sliding window algorithm described above has the disadvantage of requiring a large amount of storage memory. This becomes particularly troublesome in case a large number of instances of the algorithm are needed, as may be the case when IC is introduced in the uplink. To reduce the memory consumption a recursive algorithm was disclosed in the patent application T. Wigren, "Method and arrangement for memory-efficient estimation of noise floor", International Patent Application, PCT/SE2006/050347, 2006. (P22298). That algorithm reduces the memory requirements of the sliding window scheme discussed above at least by a factor of 100.

The difference with the interference suppressing G-rake receiver as compared to a conventional RAKE receiver is that each user sees a reduced level of interference, immediately after the so called weight combining step. In G-rake+, a covariance matrix $\hat{R}_u$, $u=1, \ldots, U$, with the order equal to the number of fingers is first estimated to capture the interference. The codes not used by the present user u may be used in order to estimate $\hat{R}_u$ The GRAKE+ receiver uses the estimated covariance matrix that models the interference for computation of the combining weights for the users u, u=1, ..., U.

$$\hat{R}_u \hat{w}_u = \hat{h}_u, \; u=1, \ldots, U$$

where $\hat{h}_u$, u=1, ..., U, is the net channel response of user u and where $\hat{w}_u$ are the combining weights.

The effect of the above equation is that GRAKE+ essentially whitens the correlated interference and removes large spectral peaks from interferers at certain finger locations and for certain antenna elements.

Note that GRAKE+ is still a linear receiver. There is a related type of IC receiver for WCDMA which is also linear, denoted the chip equalizer. The difference between GRAKE+ and the chip equalizer is simply the order of certain basic operations.

The now public patent application T. Wigren, "Load estimation in interference whitening systems", PCT/SE2009/051003 discloses means for estimation of the RoT, as seen by a user after G-rake+. This patent application defines a new signal after G-rake processing and evaluates RoT for that signal.

However, the algorithm of T. Wigren, "Load estimation in interference whitening systems", PCT/SE2009/051003 requires inversion of the impairment matrix of each user and is too computationally demanding to be preferred presently. The Frequency Domain Pre Equalizing (FDPE) receiver is another interference suppressing receiver. It also affects the measurement of uplink load. The main advantages associated with the structure of this receiver are that the FDPE structure gives significant IS gains and that the FDPE structure achieves IS for all users simultaneously, thereby reducing the computational complexity as compared to the G-rake structure that performs processing individually for all users. Processing blocks are inserted in the uplink receiver structure that is already in place, thereby reducing development cost. The fast Fourier transform (FFT) accelerator hardware developed for LTE can be reused, thereby creating further synergies for the new DUS HW of the RBS.

The FDPE algorithm performs interference whitening in the frequency domain. To explain this in detail, the following time domain signal model can be used $$v(t) = \sum_{l=0}^{L-1} h(l)z(t-l) + \eta_v(t).$$

Here v is the received (vector due to multiple antennas) signal, with chip sampling rate, h is the radio channel net response, z is the desired (transmitted) signal, and $\eta_v$ denotes thermal noise and interference. t denotes discrete time.

Taking the Fourier transform, translates the time domain equation into $$V(m) = H(m)Z(m) + N(m)$$

where the quantities are the discrete Fourier transform of the corresponding time domain quantities.

Now a whitening filter can be applied in the frequency domain. It is known that the filter that minimizes the mean square error (the MMSE solution) is given by $$W_{MMSE}(m) = (\hat{R}_d(m))^{-1} \hat{H}(m)$$

$$= \left( \begin{bmatrix} R_{0,0}(m) & R_{0,1}(m) & \cdots & R_{0,N_r-1}(m) \\ R_{1,0}(m) & R_{1,1}(m) & & \\ \vdots & & \ddots & \\ R_{N_r-1,0(m)} & & & R_{N_r-1,N_r-1}(m) \end{bmatrix} \right)^{-1} \begin{bmatrix} \hat{H}_0(m) \\ \hat{H}_1(m) \\ \\ \hat{H}_{N_r-1}(m) \end{bmatrix}$$

where $\hat{R}_d(m)$ is an estimate of the covariance matrix of V(m). Using a Cholesky decomposition the covariance matrix between the antenna elements can be factored as $$L(m) \cdot L^H(m) = \hat{R}_d(m)$$

The idea behind FDPE is to exploit this factorization and write $$W_{MMSE}(m) = (L^H(m))^{-1}((L(m))^{-1}\hat{H}(m)) = W_{pre}(m)((L(m))^{-1}\hat{H}(m))$$

so that the desired signal in the frequency domain becomes MMSE pre-equalized in the frequency domain, i.e. given by $$Z_{pre}(m) = W_{pre}(m)V(m).$$

This is a user independent processing, which is the same for all users. Hence the wideband received signal is transformed to the frequency domain and the covariance matrix is computed and Cholesky factored, after which the whitened signal is computed. The signal is then transformed back to the time domain where it is further processed for each user. Note that the channels experienced by the RAKE receivers in this processing are obtained from the second factor.

Figure 1:
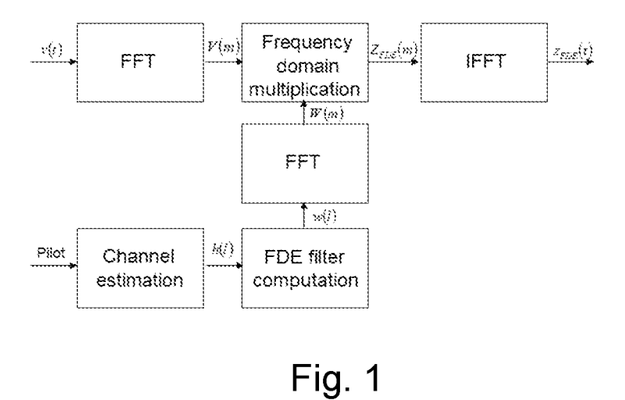
FIG. 1 illustrates a block diagram of an RoT estimation algorithm.

The FDE, Frequency Domain Equalization, algorithm performs equalization and interference suppression in the frequency domain. Contrary to the FDPE, the FDE processing is performed individually for each user. To explain the FDE algorithm, the following time domain signal model is used again and reference is made to FIG. 1

$$v(t) = \sum_{l=0}^{L-1} h(l)z(t-l) + i(t) + n^{thermal}(t).$$

Here v is the received (vector due to multiple antennas) signal, h is the radio channel net response, z is the desired (transmitted) signal, i(t) is the interference and $n^{thermal}(t)$ denotes thermal noise. t denotes discrete time.

Taking the Fourier transform, translates the above equation into $$V(m) = H(m)Z(m) + I(m) + N^{thermal}(m)$$

where the quantities are the discrete Fourier transform of the corresponding time domain quantities. Now MMSE equalization can be performed on V(m), separately for each user (different from the FDPE structure). For this purpose, the channel is estimated using the pilot signal, below this fact is emphasized by using the subscript u for user u. A first method to compute the MMSE filter for the FDE, using time domain calculations is described in E. Dahlman, S. Parkvall, J. Sköld and P. Beming, "3G Evolution-HSPA and LTE for mobile broadband-section 5.1" 2:nd edition, Academic Press, 2008.

However, rather than computing the filter coefficients in the time domain and then transforming to the frequency domain, the MMSE filter coefficients can be directly computed as in T. Wigren, A. KAngas and H. Egnell, "Load estimation in frequency domain pre-equalization systems", PCT/SE2010/051054.

$$W_u(m) = H_u^H(m)(H_u^H(m)H_u^H(m) + I_u(m)I_u^H(m) + (N^{thermal}(m))^H N^{thermal}(m))^{-1}, u = 1, \ldots, U$$

where the thermal noise power floor matrix estimate, can be obtained by any of the algorithms for noise floor estimation described above, and where $H_u(m)$ is the sampled channel frequency response vector for user u. The use of frequency domain computation is less computationally complex than the method depicted in FIG. 1, and represents the preferred embodiment for implementation of the FDE.

Finally, the equalized signal is computed by a frequency domain multiplication as $$Z_{FDE}(m) = W_u(m)V(m), u = 1, \ldots, U$$

after which the inverse FFT is applied to get the signal $z_{FDE,u}(t)$. After this step processing proceeds as in a conventional WCDMA system. The processing is repeated for all users.

In the 3GPP UTRAN architecture, NBAP (Node B Application Part) is the signaling protocol responsible for the control of the Node B by the RNC. RNSAP (Radio Network Subsystem Application Part) is a 3GPP signaling protocol responsible for communications between Radio Network Controllers. The NBAP and RNSAP protocols allow for signaling of Received total wideband power (RTWP(t)), the estimated thermal noise floor and the received scheduled enhanced uplink power (RSEPS(t)).

The details of the encoding of these messages appear in the specifications 3GPP TS 25.433, UTRAN Ibu Interface Node B Application Part (NBAP) Signaling and 3GPP TS 25.133, Requirements for support of radio resource management.

The signaling breaks the estimated RoT into two pieces, the estimated noise floor and the total wideband power. Note that 3GPP TS 25.433 and 3GPP TS 25.133 state that it is the quantities at the antenna connector that are to be signaled, signaling of other related quantities in these containers represents a proprietary solution.

U-TDOA (Uplink Time Difference of Arrival) is a real time positioning technology for wireless device networks that uses multilateration based on timing of received uplink signals to locate the wireless device.

OTDOA (Observed Time Difference of Arrival) is another real time positioning technology for wireless device networks that uses multilateration based on timing of received downlink signals to locate the wireless device.

The major conceptual difference between UTDOA and OTDOA is that the OTDOA requires multiple transmit points whilst UTDOA utilizes multiple receive points at different locations (typically BS locations), although the position calculation principle is the same.

Figure 2:
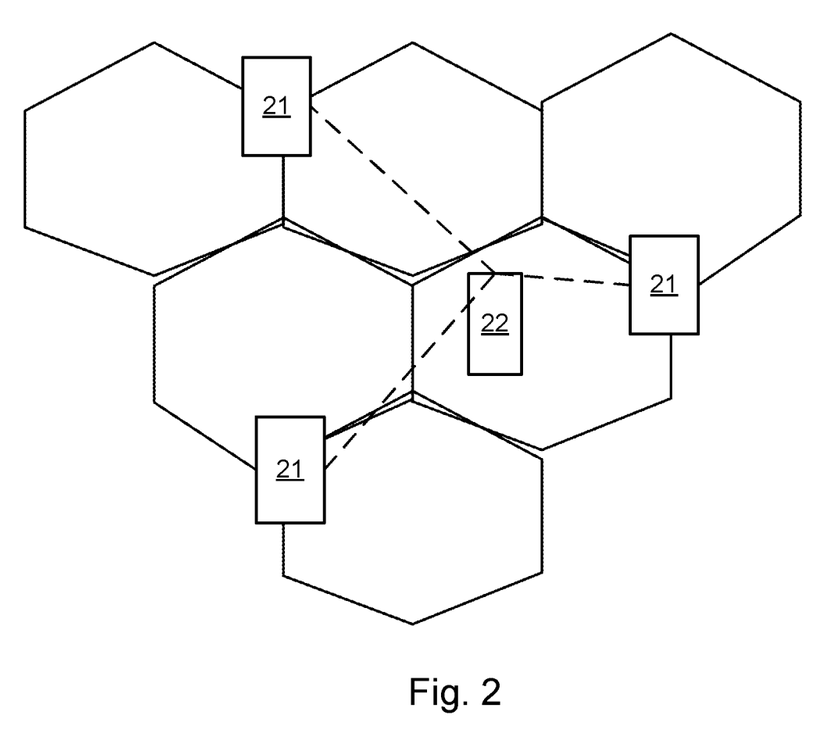
FIG. 2 illustrates schematically a principle for UTDOA position calculation.

FIG. 2 illustrates position calculation using the UTDOA method. As illustrated there are three base stations 21 that measure timing of received signals from a wireless device 22. Assuming that the measurement are successful for the base stations 21, the following relations between the measured TOAs in the base stations 21, the transmission time from the wireless device 22 and the distances between the wireless device 22 and the base stations 21 follow:

$$t_{TOA,1} + b_{clock} = T_{transmit} + \|r_1 - r_{Terminal}\|/c$$
$$\vdots$$
$$t_{TOA,n} + b_{clock} = T_{transmit} + \|r_n - r_{Terminal}\|/c.$$

Here $t_{TOA,i}$, $i=1,\ldots,n$ denotes the measured time of arrivals (TOAs) in the known measuring locations $r_i$, $i=1,\ldots,n$, $T_{transmit}$ denotes the transmission time from the wireless device 22 and c is the speed of light. The boldface quantities are the (vector) locations of the base stations 21 and the wireless device 22. $b_{clock}$ denotes the unknown clock bias of the wireless device 22 with respect to cellular system time. Now, in TDOA positioning, time of arrival differences with respect to the own site are formed according to $$t_{TDOA,2} = t_{TOA,2} - t_{TOA,1}$$
$$= T_{transmit} - b_{clock} + \|r_2 - r_{Terminal}\|/c - \|r_1 - r_{Terminal}\|/c$$
$$\vdots$$
$$t_{TDOA,n} = t_{TOA,n} - t_{TOA,1}$$
$$= T_{transmit} - b_{clock} + \|r_n - r_{Terminal}\|/c - \|r_1 - r_{Terminal}\|/c.$$

In these n-1 equations, the left hand sides are known (with some additional measurement error), provided that the time of transmission difference between the network and UE time can be measured. This is normally achieved with dedicated hardware so called location measurement units (LMUs) or by other procedures. In case of a synchronized network the difference is known. Further the locations of the base stations 21, $r_i$, $i=1,\ldots,n$, can be surveyed to within a few meters and so they are known as well. What remains unknown is the wireless device 22 location, i.e.

$$r_{Terminal} = (x_{Terminal}\, y_{Terminal}\, z_{Terminal})^T.$$

In the more common case a two dimensional positioning is performed the unknown position is instead $$r_{Terminal} = (x_{Terminal}\, y_{Terminal})^T.$$

It then follows that at least three time of arrival differences are needed in order to find a 3D wireless device position and that at least two time of arrival differences are needed in order to find a 2D wireless device position. This, in turn, means that at least four sites need to be detected for 3D wireless device positioning and at least three sites need to be detected for 2D wireless device positioning. In practice, accuracy can be improved if more measurements are collected and a maximum likelihood solution is introduced. There may also be multiple (false) solutions in cases where only a minimum number of sites are detected. The UTDOA method belongs to the set of high precision methods, the inaccuracy is however significantly larger than that of A-GPS. The main advantage of UTDOA is that it provides high precision positioning also indoors, a situation where the availability of A-GPS is very limited.

To perform UTDOA timing measurements also on user data, to increase the signal to noise ratio, one reference receiver de-codes the wireless device signals, and forwards the sequence to cooperating receivers. This procedure is relatively complex and requires a significant amount of signaling. The cooperating receivers are normally located in dedicated hardware close to the positioning node. The decoded reference sequence is used in order to regenerate the transmitted sequence from the wireless device, to allow correlation against each forwarded received set of data from the involved receivers in different locations (typically RBS locations).

The main problem with all terrestrial time difference of arrival positioning methods is to detect/be detected in a sufficient number of non-collocated locations. In the case of UTDOA the problem consists of detection of the same wireless device transmission in a sufficient number of WCDMA base stations (assuming that UTDOA timing measurements are performed in connection to WCDMA RBSs). This is in general a difficult problem since it requires a sufficiently high signal to noise ratio in a number of locations sometimes far away from the wireless device. It needs to be noted that the theoretical minimum of three neighbor locations is not enough in practice. In many situations the number of neighbors may be twice this figure to obtain a reliable performance.

There are however several problems with technology for UTDOA positioning known in prior art.

In case several carriers are available in the base station, it is not known in the positioning node which carrier, if any, UTDOA reference and receivers are available for. Note that UTDOA radio measurements are normally performed in separate HW, therefore it is not evident for which carriers this is possible. In general, having more carriers results in a more expensive radio system.

There is therefore a need for an improved solution for UTDOA positioning which solution solves or at least mitigates at least one of the above mentioned problems.

SUMMARY

An object of the present invention is thus to provide a method in a network node and a network node for UTDOA positioning which solves or at least mitigates at least one of the above mentioned problems.

A first embodiment of the present invention provides a method in a network node with positioning functionality in a wireless communications network in a multi-carrier system to enable UTDOA, Uplink Time Difference of Arrival, positioning measurements for a wireless device in the multi-carrier system. The method comprising the steps: receiving interference or load related information for carriers available for UTDOA positioning measurements; and selecting at least one carrier for UTDOA positioning measurements based on the interference or load related information.

Thus, an object of the present invention is achieved by receiving interference or load related information for carriers available for UTDOA positioning measurements and selecting at least one carrier for UTDOA positioning measurements based on the interference or load related information.

A second embodiment of the present invention provides a network node with positioning functionality in a wireless communications network in a multi-carrier system to enable UTDOA, Uplink Time Difference of Arrival, positioning measurements for a wireless device in the multi-carrier system. The network node being configured to receive interference or load related information for carriers available for UTDOA positioning measurements. The network node being further configured to select at least one carrier for UTDOA positioning measurements based on the interference or load related information.

An advantage of the present invention is that it allows for selection of the most appropriate carrier to use for UTDOA positioning measurement.

Another advantage of the present invention is that it improves UTDOA positioning success probability, in particular in high uplink load.

Further advantages and features of embodiments of the present invention will become apparent when reading the following detailed description in conjunction with the drawings.

DETAILED DESCRIPTION

In the following description, for purposes of explanation and not limitation, specific details are set forth, such as particular sequences of steps, signalling protocols and device configurations in order to provide a thorough understanding of the present invention. It will be apparent to one skilled in the art that the present invention may be carried out in other embodiments that depart from these specific details.

Moreover, those skilled in the art will appreciate that functions and means explained herein may be implemented using software functions in conjunction with a programmed microprocessor or general purpose computer, and/or using an application specific integrated circuit (ASIC). It will also be appreciated that while the current invention is primarily described in the form of methods and arrangements, the invention may also be embodied in a computer program product as well as a system comprising a computer processor and a memory coupled to the processor, wherein the memory is encoded with one or more programs that may perform the functions disclosed herein.

Figure 3:
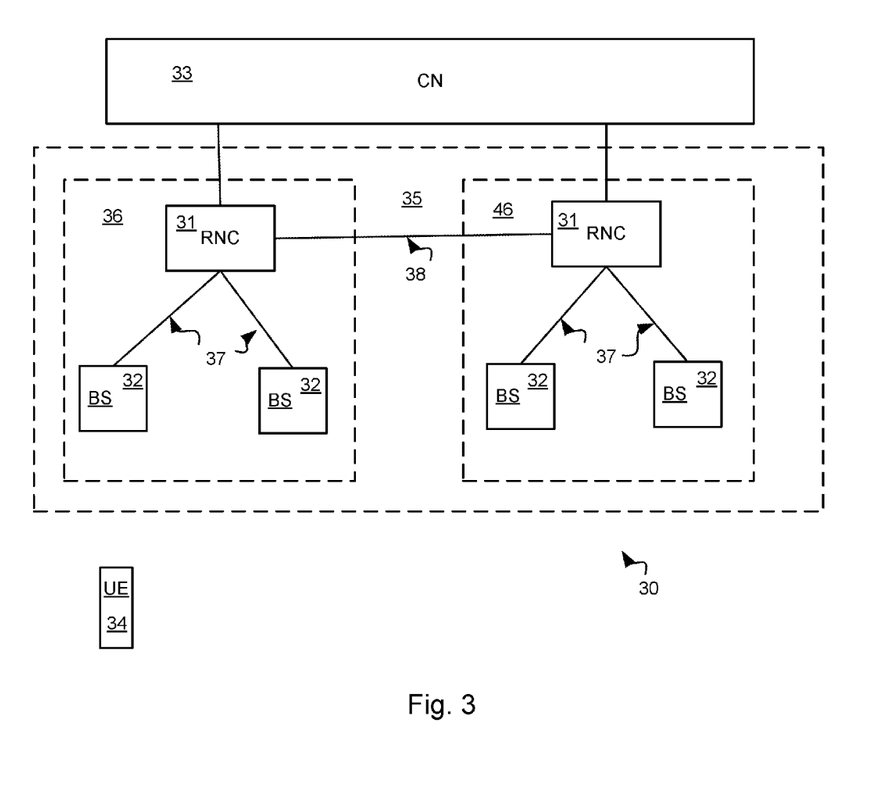
FIG. 3 illustrates schematically an example network architecture of a Radio Access Network.

FIG. 3 illustrates an example of a network architecture 30 where the network node according to the present invention may be implemented. The wireless device 34 also denoted UE is used by a subscriber (not shown) to access services offered by an operator's core network (CN) 33. The RAN 35 (Radio Access Network) is a part of the network architecture 30 that is responsible for the radio transmission and the control of radio connection. The RNS (Radio Network Subsystem) 36 controls a number of BSs 32 in the RAN 35. The RNC 31 controls radio resources and radio connectivity within a set of cells (not shown). The BS 32 handles the radio transmission and reception within one or more cells. A cell covers a geographical area. The Radio Link (not shown) is a representation of the communication between the wireless device 34 and one cell in the RAN 36. The Iub interfaces 37 are connecting the different BSs 32 to the RNCs in the RAN 35. The Iur interfaces 38 are connecting the different RNCs 31 in the RAN 35. User data is transported on so-called transport bearers on these interfaces. Dependant on the transport network used, these transport bearers could e.g. be mapped to AAL2 connections (in case of an ATM based transport network) or UDP connections (in case of an IP based transport network).

The RAN 35 may redirect the wireless device 34 to another frequency. In UMTS, this is performed when the wireless device 34 is in CELL_FACH state. When in the CELL_FACH state, the wireless device 34 autonomously selects carrier (not shown) (in 3GPP specifications, referred to as cell reselection) and signals the selected carrier according to a specified "cell update" procedure.

The carrier selection is essentially based on measurements of downlink signal quality of the common pilot channel (CPICH), which is broadcasted in each cell with a constant transmit power. More specifically, there are two options for quality metrics: Energy per chip divided by a total received non-orthogonal interference power (Ec/NO) of the common pilot channel (CPICH), or received signal code power (RSCP, i.e. signal strength) of the CPICH. In prior art solutions there is thus no handover triggered for the purpose UTDOA positioning measurements.

The 3GPP standardized two positioning architectures for control plane positioning. User plane UTDOA positioning is not possible since the UTDOA measurement is not available in the wireless device 34.

In the so-called RNC centric architecture the RNC 31 is the node where most positioning functionality is located. The RNC 31 receives positioning requests from the CN 33, determines which positioning method to use to serve the request, orders measurements to be performed by the BS 32 or the wireless device 34, computes the location of the wireless device 34, and reports the result back to the CN 33.

In LTE the BSs denoted eNodeBs also perform certain position related measurements like the TA measurement. The wireless device may perform certain positioning-related measurements like the UE RxTx measurement.

The other architecture is the so called SAS (Stand alone Serving Mobile Location Centre) centric architecture. In this architecture most of positioning functionality is taken over by the broken out SAS node, leaving the RNC as a measurement and positioning reporting relay node.

Further, three key network elements in the 3GPP positioning architecture are the LCS (Location Services) Client, the LCS target and the LCS Server. The LCS Server is a physical or logical entity managing positioning for a LCS target device by collecting measurements and other location information, assisting the LCS target in measurements when necessary, and estimating the LCS target location. A LCS Client is a software and/or hardware entity that interacts with a LCS Server for the purpose of obtaining location information for one or more LCS targets, i.e. the wireless device being positioned. LCS Clients may reside in the LCS targets themselves, radio node (e.g., eNodeB in LTE), core network node, PSAP (Public Safety Answering Point), etc. An LCS Client sends a request to LCS Server to obtain location information, and LCS Server processes and serves the received requests and sends the positioning result and optionally a velocity estimate to the LCS Client. A positioning request can be originated from the wireless device, radio network or core network. Position calculation for UTDOA would be typically conducted in the network (e.g., positioning node which is E-SMLC or SLP in LTE) or by an external node.

Below is as an example of the positioning architecture more specific to LTE described. LPPa is a protocol between eNodeB and LCS Server, used for control-plane positioning procedures, assisting user-plane positioning by querying eNodeBs for information and eNodeB measurements, to be enhanced also to support UL positioning. SUPL protocol may be used as a transport for LPP in the user plane. In the user plane with SUPL, a UE is typically referred to as SUPL Enabled Terminal (SET), the LCS platform is typically referred to as SUPL Location Platform (SLP). LCS-AP protocol is between MME and E-SMLC. Positioning is typically triggered via LCS-AP by MME itself or upon request from other nodes (e.g., eNodeB, PSAP, etc.) or UE.

Figure 6:
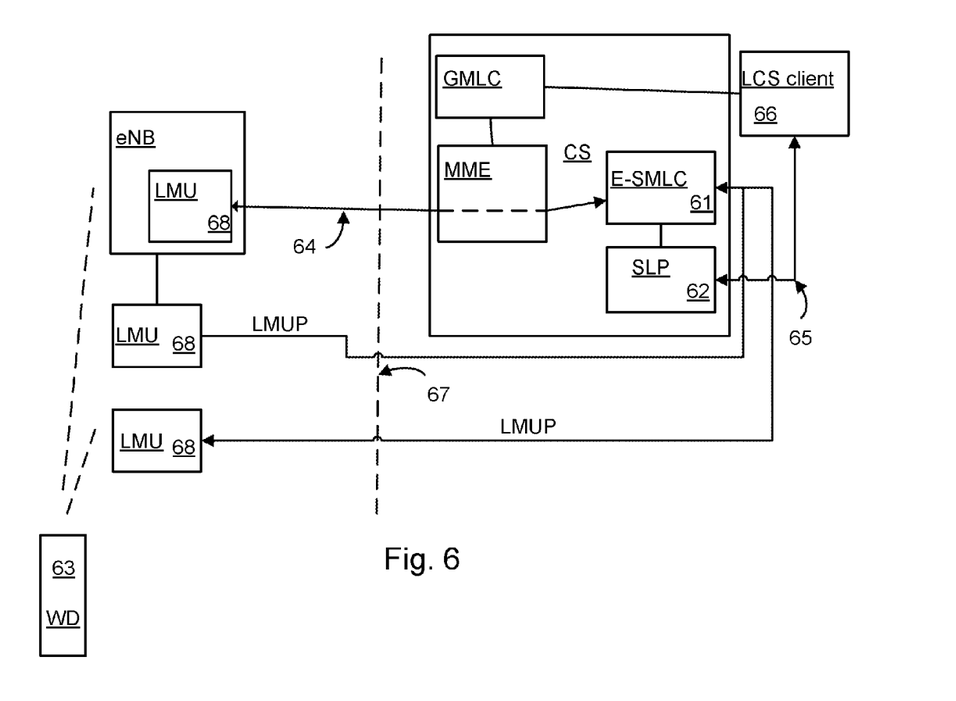
FIG. 6 illustrates a block diagram of the LTE positioning architecture

A schematic block diagram of the architecture defined in the current standard is illustrated in FIG. 6 focusing on UL positioning support, where the LCS target is a wireless device 63, and the LCS Server is an E-SMLC 61 or an SLP 62. In the FIG. 6, the control plane positioning protocols 64 with E-SMLC as the terminating point are shown. The user plane positioning protocol 65 is also shown. SLP 62 may comprise two components, SPC and SLC (not shown), which may also reside in different nodes (not shown). In an example implementation, SPC has a proprietary interface with E-SMLC, and Llp interface with SLC, and the SLC part of SLP 62 communicates with P-GVV (PDN-Gateway) and External LCS Client 66.

To support UTDOA in LTE, also UTDOA-specific protocols are being introduced in 3GPP. Thus, the SLm interface 67, between the E-SMLC 61 and LMU 68 is used for uplink positioning. The interface is terminated between a positioning server (E-SMLC 61) and LMU 68. It is used to transport LMUP protocol messages (not shown) over the E-SMLC-to-LMU interface 67. There are three different deployment options with LMU 68. As show in the FIG. 6, an LMU 68 may be integrated into eNodeB, share some equipment such as antenna with eNodeB, or be a standalone physical node with own antenna. An LMU 68 may be associated with one or more cells or radio BSs, so there may be scenarios where an LMU 68 could benefit or even has to support (in case of no continuous coverage on one frequency) more than one frequency. Further, one could also envision that an LMU 68 supports a set of frequencies (e.g., the LMU capability related to multi-frequency support) which is different from that supported by an eNodeB to which the LMU 68 may be associated. Further, in the invention, the carrier capability may relate to supported frequencies, but also the combinations of and the maximum number of simultaneously measured frequencies.

As mention above, the invention discloses methods and arrangements for selection of the most appropriate carrier to use for UTDOA positioning measurement. One important criterion that needs to be met for a successful UTDOA positioning is successful detection and decoding in the UTDOA reference measurement location. Another important criterion is successful detection in as many UTDOA neighbor measurement locations as possible. Both criteria are associated with the uplink interference situation or load situation. This is one reason why the network node according to the present invention is configured to receive interference or load related information in order to assess the interference situation or load situation on different carriers. In exemplary embodiments, as will be described, the network node is further configured to receive a capability indicator that states among others for which carriers frequencies UTDOA positioning measurements can be done.

Figure 4:
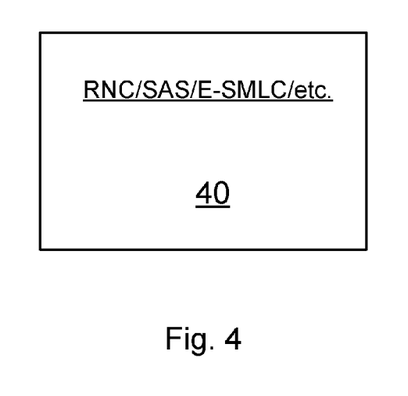
FIG. 4 illustrates a block diagram of the network node according to an exemplary embodiment of the present invention.

FIG. 4 is a schematic block diagram illustrating a network node 40 with positioning functionality according to an exemplary embodiment of the present invention. The network node 40 being configured to receive interference or load related information for carriers available for UTDOA positioning measurements. The network node 40 being further configured to select at least one carrier for UTDOA positioning measurements based on the interference or load related information.

In embodiments of the invention the network node 40 may be any radio node transmitting radio signals that may be used for positioning measurements, e.g., NodeB, eNodeB, location measurement unit (LMU) (e.g., UTDOA measurement devices are normally mounted at NodeBs), macro/micro/pico base station, home NodeB, relay, remote radio heads, sensor, multi-RAT or multi-standard radio base station, or repeater. The network node 40 may also be a RNC or a SAS.

The interference related information that is received by the network node 40 may comprise any one or more of: RoT, Rise over Thermal, or noise rise, own cell interference, neighbor cell interference, thermal noise power or total wideband power. In case of a RNC centric architecture, where an RNC (not shown) is the network node 40 the interference related information can be signalled over the Iub interface between the base station (not shown) and the RNC. The network node 40 is configured to receive the interference or load related information, over an internal interface (not shown), in case the network node 40 not being in the RNC. However, where the network node 40 is for instance a SAS node, the network node 40 is configured to receive the interference or load related information over a Iupc interface (not shown) to the network node 40.

The load related information in embodiments of the present invention may be the load on the air interface and thus the signal quality for carriers available for UTDOA positioning measurements. Further the load related information may include measured bandwidth on the carriers available for UTDOA positioning measurements. Other information that the load related information may be is frequency since lower frequencies typically provide better coverage which is crucial in large cells and may be not necessary in small cells. The load related information may also be provided for a specified frequency. The load related information may also comprise at least one value or descriptor representing the load situation or number of scheduled wireless devices or Rot over air interface for cells and carriers available for UTDOA positioning measurements.

The selection of the at least one carrier that the network node 40 is configured to perform based on the interference or load related information may be computed using different algorithms. In an exemplary embodiment the network node 40 may be further configured to select the at least one carrier for UTDOA positioning measurements based on network resource optimization since the resources for positioning measurements are shared with other services.

In order to improve the use of more than one carrier in UTDOA positioning, information about carrier capability and multi-carrier capability may be necessary in the network node 40. Further, this information enables configuring transmissions optimized for UTDOA measurements. Therefore in yet another exemplary embodiment of the present invention the network node 40 is further configured to receive at least one capability indicator that states for which carrier frequencies UTDOA positioning measurements can be done. In this exemplary embodiment the network node 40 is yet further configured to select the at least one carrier based on the at least one capability indicator. The at least one capability indicator may be received from the wireless device, a radio node or another node. The capability indicator may also comprise information about carrier frequencies supported for UTDOA measurements, wireless device multi-carrier capability or radio node multi-carrier capability.

According to exemplary embodiments of the invention, the network node 40 is aware of the carrier capability of the radio nodes that may be involved in UTDOA measurements. The capability indicator may comprise information about frequencies supported for UTDOA measurements. In one embodiment, the capability indicator may include frequency band information and/or duplex mode (e.g., half-duplex) and/or carrier bandwidth available for UTDOA measurements.

In yet another exemplary embodiment the capability indicator may include frequency capability information, e.g., a binary indicator or the number of frequencies available for multi-carrier operation which may e.g. be 2, 4 or 8. The capability indicator may further include an indication whether the multi-carrier operation is supported and/or configured by radio nodes that may be involved in UTDOA measurements. In another exemplary embodiment of the network node 40, the capability indicator further comprises information related to any one or a combination of frequency band: duplex mode and/or carrier bandwidth available for UTDOA measurements, supported by wireless device or the radio node involved in UTDOA measurements.

As mention above multi-carrier capable wireless devices may transmit the signal over multiple carriers, radio nodes that may be involved in UTDOA measurements need to be aware of this. It is also an advantage if the network node 40 is aware of this. In an exemplary embodiment of the network node 40 this information may be comprised in the capability indicator. For instance all carriers supported by the wireless device may be available for UTDOA measurements, but this is not always the case. Further, since the wireless device and the radio node involved in UTDOA measurements may support different number and, the capability indicator may include the number or the combination of frequencies available for multi-carrier operation. For example, there may be dual-carrier wireless devices in multi-carrier system which may generally support up to e.g. 4 or 8 carriers.

In yet another embodiment of the network node 40, the capability indicator may also be exchanged between radio nodes involved in UTDOA measurements, e.g., location measurement units (LMU) and NodeB or between LMUs or between NodeBs over the corresponding interfaces. In another embodiment of the network node 40, the capability indicator may be obtained (upon a request or without it) from another node, e.g., O&M or SON. In still another embodiment the network node 40 may inform the wireless device or the radio node scheduling the wireless device on the preferred/possible frequencies on which to transmit for UTDOA positioning, thereby reflecting the capability indicator.

In another exemplary embodiment of the network node 40 according to the invention the network node 40 is further configured to configure UTDOA measurements in at least one radio node involved in UTDOA measurements on the selected carrier for UTDOA positioning measurements. In this embodiment the network node 40 may be further configured to configuring selection, reselection or switching of the carrier for performing UTDOA measurements, based on the interference or load related information or capability indicator. In yet another exemplary embodiment the network node 40 triggers a switch to the selected carrier for the wireless device.

In another exemplary embodiment of the network node 40 the network node 40 is further configured to switch the primary carrier for the wireless device supporting multi-carrier operation or configure simultaneous transmissions on carriers, where the set of carriers configured for UTDOA may be smaller than the set of carriers supported in the network, depending e.g. on the capability indicator. The network node 40 may also be further configured to change from/to single-carrier operation for UTODA in the network supporting more than 1 carrier in general. In another embodiment, the network node 40 accounts for the wireless device frequency capability, for UTDOA when selecting preferable frequencies. In yet another embodiment, wireless device frequency capability statistics is collected in the network node 40. In this exemplary embodiment the selection of the preferred carrier may be based also on this statistics.

The network node 40 may also receive per carrier such information as the number of scheduled wireless devices, number of voice wireless devices, or any information reflecting the number of CS users and the total number of wireless devices, etc.

Figure 7:
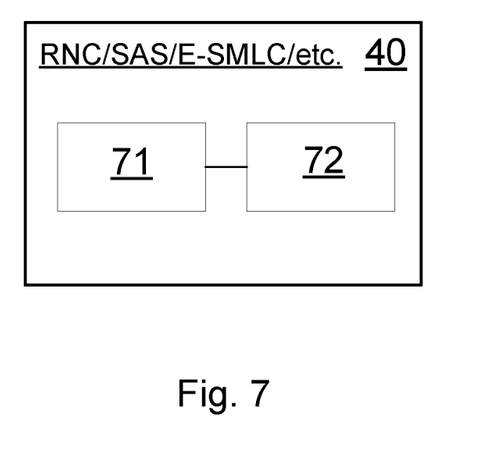
FIG. 7 illustrates a block diagram of the network node according to an exemplary embodiment of the present invention.

FIG. 7 is a schematic block diagram illustrating another exemplary embodiment of the network node 40. In this embodiment the network node 40 comprises receiving means 71 configured to receive interference or load related information for carriers available for UTDOA positioning measurements. The receiving means 71 is configured to receive same type of interference related information and load related information as in the previously described embodiments of the network node 40. The receiving means is configured to receive interference or load related information over the interfaces (not shown) described in the previously embodiments. In this embodiment the network node 40 further comprises processing means 72, connected to the receiving means 71, configured to select at least one carrier for UTDOA positioning measurements based on the interference or load related information as described in the embodiments above.

The receiving means 71 is in yet another embodiments further configured to receive at least one capability indicator that states for which carrier frequencies UTDOA positioning measurements can be done. The capability indicator comprises at least the same type of information as the previously described embodiments of the network node 40. In this exemplary embodiment the processing means 72 is yet further configured to select the at least one carrier based on the at least one capability indicator. The processing means 72 is further configured in yet another embodiment to triggers a switch to the selected carrier for the wireless device and/or to switch the primary carrier for the wireless device supporting multi-carrier operation in accordance with previously described embodiments.

Radio nodes involved in UTDOA measurements according to the present invention may apply interference suppressing receivers in the radio nodes in order to enhance the receiver performance. In that case the effective load is reduced. Instead of IS, interference cancellation may also be used and the load related information after applying interference cancellation may also be received by the network node 40.

Another aspects of the present invention relates methods for measurement of the load in terms of RoT, accounting for IS gains. The RoT is given from $$RoT_u^{G+} \equiv \frac{S_u^{G+} + I_u^{G+} + \kappa_u^{G+} \hat{N}}{\kappa_u^{G+} \hat{N}} = \frac{S_u^{G+}}{\kappa_u^{G+} \hat{N}}\left(1 + \frac{SF_{u,EDPCCH}}{\beta_{u,effective}^2}\frac{1}{SINR_u^{G+}}\right),$$

$$u = 1, \ldots, U.$$

$$\kappa_u^{G+} = (\hat{w}_u)^H \hat{W}_u, u = 1, \ldots, U.$$

$$RoT^{G+} = \max_u RoT_u^{G+}.$$

Here $RoT_u^{G+}$ is the load seen by user u, $S_u^{G+}$ is the power of user u measured after the G-rake, $SF_{u,EDPCCH}$ is the spreading factor, $\beta_{u,effective}$ is the total power factor, and $SINR_u^{G+}$ is the signal to interference ration measured after G-rake, i.e. the quantity that closes the inner power control loop. As can be seen, the cell load is selected as the maximum rise over thermal, as seen by any user of the cell. This is the limiting user of the cell.

An equivalent of the RoT can be computed after FDPE IS gains. The end result is given by $$RoT^{FDPE} = \frac{z_{pre}^H(t)z_{pre}(t)}{\left(\sum_{l=0}^{L-1} w_{pre}^H(l)w_{pre}(l)\right)\left(\sum_{a=1}^{A} \hat{N}_a^{thermal}\right)}.$$

Here $RoT^{FDPE}$ is the load, $z_{pre}(t)$ is the whitened signal in the time domain, $w_{pre}(l), l=0, \ldots, L-1$ is the impulse response of the whitening filter, and $\hat{N}_a^{thermal}$, a=1, ..., A, are the estimated thermal noise floors of the A antenna branches.

The quantities above should be computed as averages or estimates over a time interval where the whitening filter of the FDPE remains constant. Since the total received wideband power is summed over all antenna branches, so is the thermal noise power floor. The RoT after FDPE is also scaled with the power of the pre-whitening filter. It can be noted that the use of FDPE handles the received signal as a whole, without a need to consider individual users. This advantage is retained for the load estimation algorithm.

An equivalent of the RoT can be computed after FDE IS gains, for each user. The end result is given by, $$RoT_u^{FDE} = \frac{z_{FDE,u}^H(t)z_{FDE,u}(t)}{\left(\sum_{l=0}^{L-1} w_u^H(l)w_u(l)\right)\left(\sum_{a=1}^{A} \hat{N}_a^{thermal}\right)}, u = 1, \ldots, U.$$

Here $RoT_u^{FDE}$ is the load of user u, $z_{pre,u}(t)$ is the whitened signal in the time domain, $w_{pre,u}(l), l=0, \ldots, L-1$ is the impulse response of the whitening filter, and $\hat{N}_a^{thermal}$, a=1, ..., A, are the estimated thermal noise floors of the A antenna branches.

The quantities above should be computed as averages or estimates over a time interval where the equalizing filter of the FDE remains constant. Since the total received wideband power is summed over all antenna branches, so is the thermal noise power floor. The RoT after FDE is also scaled with the power of the equalizing filter. As in the G-rake case, the dominating user of the cell is selected as $$RoT^{FDE} = \max_u RoT_u^{FDE}$$

The RoT before and/or after IS processing normally varies fast, being affected e.g. by channel variations. The carrier selection according to the present invention is a slower selection process as compared to the variations in RoT. Therefore, exemplary embodiments of the network node therefore rather rely on interference or load related information based on the average uplink load, obtained for a typical time interval. This time interval or filtering time constant is preferably tuned to be of the same order as the bandwidth of the carrier selection process.

As a typical embodiment of this filtering process a first order autoregressive filter can be used:

$$\langle RoT \rangle(t+T) = \alpha \langle RoT \rangle(t) + (1-\alpha)RoT_{Input}(t)$$

where $\langle RoT \rangle$ is the average load, T is the update time period, e.g., 10 ms, α is the time constant and $RoT_{Input}$ is any of the RoT at the antenna connector, $RoT^{G+}$, $RoT^{FDPE}$ or $RoT^{FDE}$.

This filtering is preferably performed in the network node 40 according to the present invention.

The RoT after IS processing have no associated signalling—the definition of the measurement of these RoT equivalents are different from the air interface RoT.

As mentioned above, the network node 40 is therefore in an exemplary embodiment configured to select the carriers for which RoT of various kinds shall be measured. Note that the measurements are however not limited to only RoT.

In exemplary embodiments the selection is further based on the received capability indicator containing e.g. information about UTDOA position measurement capability. In another exemplary embodiment is the selection also based on the database of cell relations, cell positions and antenna directions that needs to be configured in the network node, or at least be available in the network node.

In yet another embodiment the network node 40 is further configured to indicate a measurement order and information of which type of RoT that is preferred.

The interference related information that is received by the network node 40 may comprise RoT measurement information, together with an indication of what type of RoT information that is signalled.

In an exemplary embodiment the network node 40 is configured to evaluate a criterion, for each carrier alternative, where the criterion is responsive to the measured and received load related information, i.e. $\langle RoT \rangle$(carrier, cell), cell $\in \{cell_i\}$, i $\in \{neigbors\}$ carrier $\in \{UTDOA$ capable carriers$\}$. This is however not enough. The neighbour cells have different antenna directions and locations as well. Therefore the load related information may be complemented with the predicted path loss and the predicted antenna gain, for each cell. This information needs to be available in databases, accessible by the network node 40.

It is now possible to set up a cost for each cell and carrier combination, $$J(\text{carrier,cell,servingcell}) = \langle RoT \rangle(\text{carrier,cell}) + \langle Pathloss \rangle(\text{carrier,cell, servingcell})| - \langle \text{Antenna-gain} \rangle(\text{cell, servingcell})$$

Here the path loss is counted from the centre of the serving cell to the antenna location of the RBS of the associated UTDOA location measurement unit. The antenna gain is computed using the angle between the centre of the serving cell and the antenna location of the RBS of the UTDOA position measurement unit.

The bore sight angle of the antenna of the cell of the RBS of the UTDOA position measurement unit.

All quantities are expressed in dB. The network node 40 then selects the carrier by calculation of The minimum threshold value $\bar{J}$(carrier), for each carrier, for which $J$(carrier, cell, servingcell)$\leq \bar{J}$(carrier) for $N$ cells, and $$selectedcarrier = \underset{carrier}{\arg\min} \bar{J}(\text{carrier})$$

The network node 40 is as described above in an exemplary embodiment configured to force the wireless device to the selected carrier, both in case of conventional carrier selection performed by the RNC and multi carrier. The network node 40 may be configured to trigger or initiate handover and carriers switching. In UMTS, these decisions are typically made by the RNC and possibly the NodeB. In the prior art, however, these decisions cannot be triggered by UTDOA positioning functionality accounting to optimize UTDOA performance.

Figure 5:
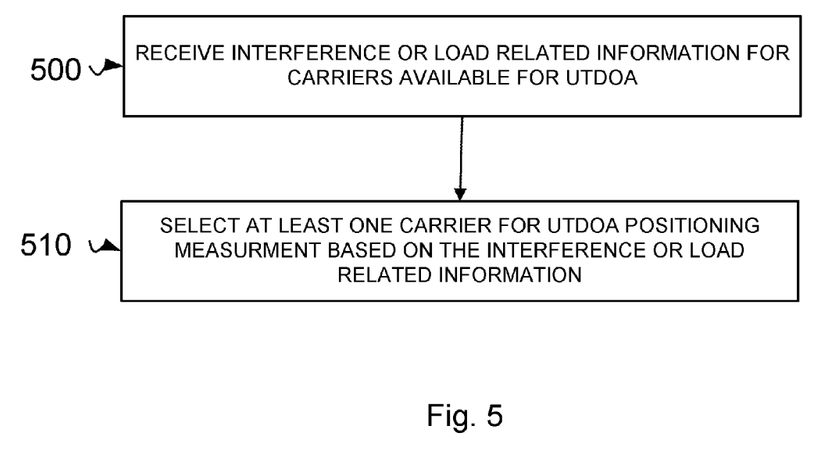
FIG. 5 illustrates a flow diagram of a method according to an exemplary embodiment of the invention.

Referring to FIG. 5 there is illustrated a flowchart of a method describing the steps in the network node 40 with positioning functionality in a wireless communications network in a multi-carrier system to enable UTDOA, positioning measurements for a wireless device in the multi-carrier system, in accordance with previously described embodiments of the present invention. As shown in FIG. 6, the method comprises:

500 receiving interference or load related information for carriers available for UTDOA positioning measurements; and

510 selecting at least one carrier for UTDOA positioning measurements based on the interference or load related information.

As previously described the method may also comprise the further step of (not shown) configuring UTDOA measurements in at least one radio node involved in UTDOA measurements on the selected carrier for UTDOA positioning measurements. This step may also comprise selection, reselection or switching of the carrier for performing UTDOA measurements, based on said interference or load related information or capability indicator.

In another embodiment of the method, the method comprising a further step of, prior to the step of receiving, receiving also at least one capability indicator that states for which carriers frequencies UTDOA positioning measurements can be done. In this embodiment the step of selecting is further based on the at least one capability indicator.

In yet another exemplary embodiment of the method, the method comprises a further step of, after the step of selecting, configuring transmission for the wireless device on the selected carrier for UTDOA positioning measurements.

Although this description is mainly given using the term wireless device, it should be understood by the skilled in the art that wireless device is a non-limiting term which means any UE, User Equipment, or node (e.g. PDA, laptop, mobile, sensor, fixed relay, mobile relay or even a small base station that is being positioned when timing measurements for positioning are considered, i.e. a LCS target in general). The invention applies both for wireless devices capable and not capable of multi-carrier operation.

The embodiments of the invention are not limited to VVCDMA, but may, with obvious modifications, apply with any RAN, single- or multi-RAT. Some other RAT examples are LTE, LTE-Advanced, UMTS TDD, GSM, cdma2000, WiMAX, and WiFi. A multi-carrier network node may be also the network node capable of carrier aggregation for UMTS and LTE, which in addition may also be a multi-standard radio base station.

The invention claimed is:

1. A method in a network node with positioning functionality in a wireless communications network in a multi-carrier system with carrier aggregation, each aggregated carrier corresponding to a component carrier, to enable UTDOA, Uplink Time Difference of Arrival, positioning measurements for a wireless device in the multi-carrier system, the method comprising the steps:
    obtaining multi-carrier capability of a radio node capable of performing UTDOA positioning measurements,
    receiving interference or load related information for multiple component carriers at the radio node performing UTDOA positioning measurements in the multi-carrier system that are supported for UTDOA positioning measurements; and
    selecting at least one of the multiple component carriers for UTDOA positioning measurements on radio signals transmitted by the wireless device based on said interference or load related information.

2. The method of claim 1 further comprising a step of, after said step of selecting,
    configuring UTDOA measurements in at least one radio node on said selected carrier for UTDOA positioning measurements.

3. The method of claim 2, wherein the radio node is any of: an eNodeB, NodeB, or location measurement unit, LMU.

4. The method of claim 1, wherein said method comprising a further step of, prior to said step of receiving,
receiving at least one capability indicator that identifies which carrier frequencies UTDOA positioning measurements can be done, said step of selecting being further based on said at least one capability indicator.

5. The method of claim 4, wherein the step of configuring is further comprising selection, reselection, or switching of the carrier for performing UTDOA measurements, based on said interference or load related information or capability indicator.

6. The method of claim 4, wherein said step of receiving at least one capability indicator further comprising receiving the at least one capability indicator from a user equipment, UE, a radio node, or another network node.

7. The method of claim 4, wherein the capability indicator further comprises at least one of: information about carrier frequencies supported for UTDOA measurements, a user equipment, UE, multi-carrier capability, or radio node multi-carrier capability.

8. The method of claim 4, wherein the capability indicator further comprises information related to any one or a combination of: frequency band, duplex mode, and/or carrier bandwidth available for UTDOA measurements supported by a user equipment, UE, or at least one radio node on said selected carrier.

9. The method of claim 1, wherein the network node is any of: a positioning node, radio network controller, RNC, evolved-serving mobile location center, E-SMLC, Stand alone Serving Mobile Location Centre, SAS, location measurement unit, LMU, or eNodeB.

10. The method of claim 4, wherein the capability indicator further comprises any one or more of: an indication of whether multi-carrier operation is supported and/or configured by at least one radio node on said selected carrier, a number of carriers that can be configured for multi-carrier operation, or a combination of carriers that is configured for multi-carrier operation or that is relevant for UTDOA.

11. The method of claim 4, wherein the capability indicator further comprises the information about which combinations of two or more carrier frequencies are supported by a user equipment, UE, configured for the UE, or available for UTDOA measurements.

12. The method of claim 1, wherein the interference related information comprises any one or more of: RoT, Rise over Thermal, noise rise, own cell interference, neighbor cell interference, thermal noise power, or total wideband power.

13. The method of claim 1, wherein the load related information comprises at least one value or descriptor representing the load situation, a number of scheduled wireless devices, or RoT, Rise over Thermal, over air interface for cells and carriers available for UTDOA positioning measurements.

14. The method of claim 1, wherein said method comprising a further step of, after said step of selecting,
configuring transmission for said wireless device on said selected carrier for UTDOA positioning measurements.

15. The method of claim 14, wherein said step of configuring further comprises carrier switching or handover for said wireless device.

16. A network node with positioning functionality in a wireless communications network in a multi-carrier system to enable UTDOA, Uplink Time Difference of Arrival, positioning measurements for a wireless device in the multi-carrier system, the network node comprising:
communications circuitry configured to receive interference or load related information for multiple component carriers at the radio node performing UTDOA positioning measurements in the multi-carrier system that are supported for UTDOA positioning measurements; and
one or more data processors configured to obtain multi-carrier capability of a radio node capable of performing UTDOA positioning measurements and to select at least one of the multiple component carriers for UTDOA positioning measurements on radio signals transmitted by the wireless device based on said interference or load related information.

17. The network node of claim 16, wherein the network node is configured to configure UTDOA measurements in at least one radio node on said selected carrier for UTDOA positioning measurements.

18. The network node of claim 17, wherein the radio node is any of: an eNodeB, NodeB, or location measurement unit, LMU.

19. The network node of claim 16, wherein the network node is configured to receive at least one capability indicator that identifies for which carrier frequencies UTDOA positioning measurements can be done, and wherein said network node being further configured to select said at least one carrier based on said at least one capability indicator.

20. The network node of claim 17, wherein the network node is configured for selection, reselection, or switching of the carrier for performing UTDOA measurements, based on said interference or load related information or capability indicator.

21. The network node of claim 19, wherein said at least one capability indicator is received from a UE, User Equipment, a radio node, or another network node.

22. The network node of claim 19, wherein the capability indicator further comprises at least one of: information about carrier frequencies supported for UTDOA measurements, user equipment, UE, multi-carrier capability, or radio node multi-carrier capability.

23. The network node of claim 19, wherein the capability indicator further comprises information related to any one frequency band or a combination of frequency bands: duplex mode and/or carrier bandwidth available for UTDOA measurements, supported by the wireless device or the radio node.

24. The network node of claim 16, wherein the radio node is any of: a positioning node, radio network controller, RNC, evolved-serving mobile location center, E-SMLC, Stand alone Serving Mobile Location Centre, SAS, location measurement unit, LMU, or eNodeB.

25. The network node of claim 19, wherein the capability indicator further comprises any one or more of: an indication on whether multi-carrier operation is supported and/or configured by the radio node, number of carriers that can be configured for multi-carrier operation, combination of carriers configured for multi-carrier operation or relevant for UTDOA.

26. The network node of claim 19, wherein the capability indicator further comprises the information about which combinations of two or more carrier frequencies are supported by the UE, configured for the UE, or available for UTDOA measurements.

27. The network node of claim 16, wherein the interference related information comprises any one or more of: RoT, Rise over Thermal, noise rise, own cell interference, neighbor cell interference, thermal noise power, or total wideband power.

28. The network node of claim 16, wherein the load related information comprises at least one value or descriptor representing the load situation, number of scheduled wireless devices, RoT, Rise over Thermal over the air interface for cells and carriers available for UTDOA positioning measurements.

29. The network node of claim 16, wherein said network node is configured to configure transmission for said wireless device on said selected carrier for UTDOA positioning measurements.

30. The network node of claim 29, wherein said network node is configured to perform carrier switching or handover for said wireless device.

\* \* \* \* \*

UNITED STATES PATENT AND TRADEMARK OFFICE
CERTIFICATE OF CORRECTION

PATENT NO. : 8,743,725 B2  
APPLICATION NO. : 13/393322  
DATED : June 3, 2014  
INVENTOR(S) : Wigren et al.

It is certified that error appears in the above-identified patent and that said Letters Patent is hereby corrected as shown below:

In the Specification

In Column 7, Lines 3-4, delete "$W_u(m) = H_u^H(m)(H_u^H(m)H_u^H(m) + I_u(m)I_u^H(m) + (N^{thermal}(m))^H N^{thermal}(m))^{-1}, u = 1, \ldots, U$" and insert -- $W_u(m) = H_u^H(m)(H_u^H(m)H_u^H(m) + I_u(m)I_u^H(m) + (N^{thermal}(m))^H N^{thermal}(m))^{-1}, u = 1, \ldots, U$ --, therefor.

In Column 10, Line 51, delete "RAN 36." and insert -- RAN 35. --, therefor.

In Column 12, Lines 7-8, delete "P-GVV (PDN-Gateway)" and insert -- P-GW (PDN-Gateway) --, therefor.

In Column 18, Line 35, delete "VVCDMA," and insert -- WCDMA, --, therefor.

Signed and Sealed this  
Ninth Day of December, 2014

Michelle K. Lee  
*Deputy Director of the United States Patent and Trademark Office*